US008653768B2

(12) United States Patent
Stulz et al.

(10) Patent No.: US 8,653,768 B2
(45) Date of Patent: Feb. 18, 2014

(54) FLUX OFFSET COMPENSATION FOR A ROTATING ELECTRICAL MACHINE (75) Inventors: Christian Stulz, Zürich (CH); Halina Burzanowska, Untersiggenthal (CH)

(73) Assignee: ABB Technology AG, Zurich (CH)

( * ) Notice: Subject to any disclaimer, the term of this patent is extended or adjusted under 35 U.S.C. 154(b) by 131 days.

(21) Appl. No.: 13/233,645

(22) Filed: Sep. 15, 2011

(65) Prior Publication Data

US 2012/0068640 A1   Mar. 22, 2012

(30) Foreign Application Priority Data

Sep. 16, 2010   (EP) ..................................... 10176976

(51) Int. Cl.
H02P 21/14   (2006.01)
(52) U.S. Cl.
USPC ................. 318/400.02; 310/156.07; 310/190; 310/223; 310/49.32; 310/49.35
(58) Field of Classification Search
USPC ............ 318/121, 400.01, 492–495, 503, 504; 310/49.32–49.35, 156.07, 156.49, 310/156.55, 190, 223
See application file for complete search history.

(56) References Cited

U.S. PATENT DOCUMENTS

| | | | | |
|---|---|---|---|---|
| 5,170,116 A | * | 12/1992 | Bavard et al. | 318/798 |
| 6,137,258 A | * | 10/2000 | Jansen | 318/802 |
| 6,448,735 B1 | | 9/2002 | Gokhale et al. | |
| 6,731,083 B2 | * | 5/2004 | Marcinkiewicz | 318/254.2 |
| 7,643,914 B2 | * | 1/2010 | Loudot et al. | 701/22 |
| 2001/0008371 A1 | * | 7/2001 | Norrkniivila et al. | 318/599 |
| 2002/0041171 A1 | | 4/2002 | Cho | |
| 2005/0057208 A1 | * | 3/2005 | Seibel et al. | 318/432 |
| 2006/0066275 A1 | * | 3/2006 | Thunes et al. | 318/432 |
| 2008/0024114 A1 | * | 1/2008 | Weng et al. | 324/127 |
| 2008/0167769 A1 | * | 7/2008 | Loudot et al. | 701/22 |

FOREIGN PATENT DOCUMENTS

| | | |
|---|---|---|
| CN | 101582675 A | 11/2009 |
| DE | 100 20 136 A1 | 10/2001 |
| JP | 2006-136053 A | 5/2006 |
| TW | 441161 B | 6/2001 |

OTHER PUBLICATIONS

Haque, M.E.; Zhong, L.; Rahman, M.F.; , "A sensorless speed estimator for application in a direct torque controller of an interior permanent magnet synchronous motor drive, incorporating compensation of offset error," Power Electronics Specialists Conference, 2002. pesc 02. 2002 IEEE 33rd Annual , vol. 1, No., pp. 276-281 vol. 1, 2002.*

(Continued)

*Primary Examiner* — Eduardo Colon Santana
*Assistant Examiner* — Said Bouziane
(74) *Attorney, Agent, or Firm* — Buchanan Ingersoll & Rooney PC (57) ABSTRACT A method is provided for compensating the flux drift caused by measurement and/or calculation errors when controlling a rotating electrical machine. The flux drift of the estimated flux vector may be compensated for by comparing the length of the flux vector with a reference flux magnitude which already has been determined for controlling the inverter. Depending on the comparison, the length of the estimated flux vector may be lengthened or shortened.

25 Claims, 5 Drawing Sheets (56) References Cited

OTHER PUBLICATIONS

Gaolin Wang; Dianguo Xu; Yong Yu; Wei Chen; , "Improved rotor flux estimation based on voltage model for sensorless field-oriented controlled induction motor drives," Power Electronics Specialists Conference, 2008. PESC 2008. IEEE , vol., No., pp. 1887-1890, Jun. 15-19, 2008.*

Haque, M.E.; Zhong, L.; Rahman, M.F., "A sensorless speed estimator for application in a direct torque controller of an interior permanent magnet synchronous motor drive, incorporating compensation of offset error," Power Electronics Specialists Conference, 2002. pesc 02. 2002 IEEE 33rd Annual , vol. 1, No., pp. 276,281 vol. 1, 2002.*

Wenyan Zeng, "F Oriented Torque Control of Induction machine Drives for electric Vehicles—with and without Mechanical Sensors", Feb. 1, 1995, pp. 82-107.

European Search Report issued on May 3, 2011.

* cited by examiner

Voltage Source Inverter 12
Step-Up Transformer 14
Step-Down Transformer 18
Controller 24

Voltage Vector Module 34
Current Vector Module 36
Flux Vector Module 38
Torque Vector Module 40

FLUX OFFSET COMPENSATION FOR A ROTATING ELECTRICAL MACHINE

RELATED APPLICATION

This application claims priority under 35 U.S.C. §119 to European Patent Application No. 10176976.8 filed in Europe on Sep. 16, 2010, the entire content of which is hereby incorporated by reference in its entirety.

FIELD

The present disclosure relates to the field of controlling rotating electrical machines. More particularly, the present disclosure relates to a method for calculating the flux in a rotating electrical machine, a method for controlling an inverter, a non-transitory computer-readable recording medium having a program recorded thereon that causes a processor of a computer processing device to carry out these methods, a controller for the inverter, and a system including a rotating electrical machine.

BACKGROUND INFORMATION

It is generally not possible to directly measure the flux and torque in a rotating electrical machine, which values may be needed for controlling the rotating electrical machine.

For example, in long motor feeds for oil platforms, the motor (being the electrical machine) and the inverter are separated by long distances, which may be up to ten or more kilometers. For such applications, the control approach may be based on the pulse width and an open loop scalar mode where the resistive voltage drops cannot be estimated accurately. The open loop control is integrated with dynamic torque control (DTC) and vector control approaches, and the same hardware measurements and diagnostic may be applied.

The errors in the resistive voltage drop may influence the accuracy of the estimated flux and the estimated torque. There may be other error sources which may cause an erroneous estimated flux, such as measuring gain and offset errors in the DC intermediate voltage and phase currents, inaccurate estimates of inverter power switches losses or the used integration algorithm.

One known solution for compensating the errors may be to estimate the resistive losses on line and use the estimation in the integration loop. Another possible solution may be to add the measurement of the motor voltage and to apply this to the flux calculation.

A further method may be based on the estimates of the minimum and the maximum flux level within one period and add the average obtained that way to the flux estimate or to directly apply the correction to the voltage vector. However, this may have the disadvantage that it may not result in a good correction, when the frequency of the motor is changing.

Solutions for compensation flux errors may be found in US 2002 0041171 A1 relating to flux observation, TW 441161 A relating to on line parameters adaptation, and JP 2006 136053 A showing a flux offset correction control unit which corrects the electric current using the calculated offset components.

SUMMARY

An exemplary embodiment of the present disclosure provides a method for calculating the flux in a rotating electrical machine which is electrically supplied by an inverter. The exemplary method includes determining an inverter voltage vector, determining an inverter current vector, and calculating an estimated flux vector based on the inverter voltage vector and the inverter current vector. In addition, the exemplary method includes comparing a length of the estimated flux vector with a reference flux magnitude, and compensating for errors by changing the length of the estimated flux vector, depending on the comparison of the length of the estimated flux vector with the reference flux magnitude.

An exemplary embodiment of the present disclosure provides a method for controlling an inverter. The exemplary method includes setting a reference angular frequency for a rotating electrical machine, determining a reference voltage from the reference angular frequency, and controlling switches of the inverter, such that modulated output voltages of the inverter are generated which correspond to the reference voltage. The exemplary method also includes determining an inverter voltage vector, determining an inverter current vector, determining an estimated flux vector based on the inverter voltage vector and the inverter, current vector, and using the estimated flux vector for diagnostics.

An exemplary embodiment of the present disclosure provides a non-transitory computer-readable recording medium having a program recorded thereon that causes a processor of a computer processing device to execute operations including: determining an inverter voltage vector; determining an inverter current vector; calculating an estimated flux vector based on the inverter voltage vector and the inverter current vector; comparing a length of the estimated flux vector with a reference flux magnitude; and compensating for errors by changing the length of the estimated flux vector, depending on the comparison of the length of the estimated flux vector with the reference flux magnitude.

An exemplary embodiment of the present disclosure provides a controller for an inverter. The controller includes a processor configured to: determine an inverter voltage vector; determine an inverter current vector; calculate an estimated flux vector based on the inverter voltage vector and the inverter current vector; compare a length of the estimated flux vector with a reference flux magnitude; and compensate for errors by changing the length of the estimated flux vector, depending on the comparison of the length of the estimated flux vector with the reference flux magnitude.

An exemplary embodiment of the present disclosure provides a controller for an inverter. The controller includes a processor configured to: set a reference angular frequency for a rotating electrical machine; determine a reference voltage from the reference angular frequency; control switches of the inverter, such that modulated output voltages of the inverter are generated which correspond to the reference voltage; determine an inverter voltage vector; determine an inverter current vector; determine an estimated flux vector based on the inverter voltage vector and the inverter current vector; and use the estimated flux vector for diagnostics.

An exemplary embodiment of the present disclosure provides a system which includes an inverter having a controller as described above. The exemplary system also includes a cable connected to an output of the inverter, and a rotating electrical machine situated at another geographic location from the inverter and supplied by the cable. Sensors for determining input parameters for the determination of the estimated flux vector by the controller of the inverter are situated at the inverter.

An exemplary embodiment of the present disclosure provides a non-transitory computer-readable recording medium having a program recorded thereon that causes a processor of a computer processing device to execute operations comprising: setting a reference angular frequency for a rotating electrical machine; determining a reference voltage from the reference angular frequency; controlling switches of the inverter, such that modulated output voltages of the inverter are generated which correspond to the reference voltage; determining an inverter voltage vector; determining an inverter current vector; determining an estimated flux vector based on the inverter voltage vector and the inverter current vector; and using the estimated flux vector for diagnostics.

BRIEF DESCRIPTION OF THE DRAWINGS

Additional refinements, advantages and features of the present disclosure are described in more detail below with reference to exemplary embodiments illustrated in the drawings, in which.

In principle, identical parts are provided with the same reference symbols in the drawings.

DETAILED DESCRIPTION

Exemplary embodiments of the present disclosure provide a method for accurately correcting errors in an open loop control of a rotating electrical machine.

Exemplary embodiments of the present disclosure provide a method and a controller for calculating the flux in a rotating electrical machine which is electrically supplied by an inverter, a method and a controller for controlling an inverter, a non-transitory computer-readable recording medium having a computer program recorded thereon that causes a processor of a computer processing device to execute any of the above-described methods, and a system including an inverter with the above-described controller.

An exemplary embodiment of the present disclosure provides a method for calculating the flux in a rotating electrical machine. A rotating electrical machine may be an electrical motor such as an induction motor, a synchronous or a permanent magnet motor.

According to an exemplary embodiment of the present disclosure, the rotating electrical machine is electrically supplied by an inverter. The inverter may pulse width modulate a current from a DC link for supplying the rotating electrical machine with varying electrical energy. The inverter may have a controller for controlling the switch states of the inverter and/or for controlling the frequency and the torque for the rotating electrical machine.

According to an exemplary embodiment of the present disclosure, the method can include the following steps: determining an inverter voltage vector; determining an inverter current vector; calculating an estimated flux vector based on the inverter voltage vector and the inverter current vector; and compensating for measurement and/or calculation errors by changing the length of the estimated flux vector, depending on a comparison of the estimated flux (which may be the absolute value or magnitude of the estimated flux vector) and a reference flux (which may be the magnitude/length of a reference flux vector). The reference flux may be determined based on a reference angular frequency of the rotating electrical machine.

In this way, the flux drift of the estimated flux vector caused by measurement and/or calculation errors may be compensated for by comparing the estimated flux vector with a reference flux vector (or the length of the vectors) which has already been determined for controlling the inverter. For example, depending on the comparison of their lengths, the length of the estimated flux vector may be lengthened or shortened.

In accordance with an exemplary embodiment, the offset compensation may be applied without knowing a complete period of the estimated flux vector. Thus, also when the frequency of the rotating electrical machine is changing, the method may generate a good error correction, for example, when only the length of the estimated flux vector is changed. Changing only the length of the estimated flux vector may mean that only the magnitude but not the direction of the estimated flux vector is changed.

This may bring at least the following advantageous effects: (i) the estimated flux vector may be stabilized by the control; (ii) the calculated frequency based on the estimated flux vector may be improved; (iii) the estimated electromagnetic torque may be more accurate; and/or (iv) the electromagnetic torque and power signals for diagnostic may be improved.

According to an exemplary embodiment of the present disclosure, the method for controlling the rotating electrical machine and for compensation of the estimated flux vector drift in the open loop control may be applied to motors with very long motor feeds which additionally may have step-up and step-down transformers. The method may be used for controlling a voltage source inverter, in scalar (open loop) flux control, and/or in an electrical motor supplied with long feeds with additional step up and step down transformers in the drive system.

In the last case, the method for flux offset compensation and electromagnetic torque correction in scalar mode with pulse width modulation may improve the flux, torque, power estimations in drive applications with long motor feeds with step-up and step-down transformers.

According to an exemplary embodiment of the present disclosure, the method can additionally include: shortening the estimated flux vector, if the estimated flux magnitude is bigger than the reference flux magnitude; and/or lengthening the estimated flux vector, if the estimated flux magnitude is smaller than the reference flux magnitude. In this way, when the method for compensation errors is applied, the estimated flux vector may be shifted in the direction of the (not known) real flux vector. It is not necessary to completely compensate for the errors in one calculation step. Every time the method is applied, the compensated estimated flux vector is a bit less erroneous than the estimated flux vector without compensation.

For example, the lengthening and the shortening of the estimated flux vector may be performed by: determining an offset vector by multiplying the estimated flux vector with a factor, where the factor depends on the ratio of the reference flux magnitude and the estimated flux magnitude, and changing the length of the estimated flux vector by adding the offset vector to the estimated flux vector. Thus, the length of the estimated flux vector is changed without changing the direction of the estimated flux vector. In other words, the factor may be a real factor (and not a complex number).

According to an exemplary embodiment of the present disclosure, the difference between the estimated flux magnitude and the reference flux magnitude is determined, and the factor depends on the ratio of the difference and the estimated flux magnitude. Thus, the compensation may be linearly dependent on the deviation between the estimated flux magnitude and the reference flux magnitude.

According to an exemplary embodiment of the present disclosure, the factor includes a fixed gain value, which may be between 0.5 and 0.4, for example 0.1 and 0.2. Experiments have shown that a fixed gain factor of this value results in a good convergence of the error compensation.

For saving the calculation time, it may be possible that the compensation is not done every time the estimated flux vector is calculated. According to an exemplary embodiment of the present disclosure, the estimated flux vector is calculated in a first discrete time domain, and the compensation of the errors is executed in a second discrete time domain, where one step of the second discrete time domain is N steps of the first discrete time domain.

According to an exemplary embodiment of the present disclosure, the inverter voltage vector is determined based on the switching positions of the inverter and the voltages at the inputs of the inverter.

According to an exemplary embodiment of the present disclosure, the inverter current vector is determined based on the currents at the inputs and/or the outputs of the inverter.

According to an exemplary embodiment of the present disclosure, the estimated flux vector is derived (for example, in a discrete time domain) from a previous flux vector by adding a difference vector and a voltage loss vector. The difference vector may depend on a reference angular frequency, the length of a discrete time step and the inverter voltage vector. The voltage loss vector may depend on the reference angular frequency, the length of the discrete time step, a predefined resistor value and the inverter current vector.

An exemplary embodiment of the present disclosure provides a method for controlling an inverter. According to an exemplary embodiment of the present disclosure, the method for controlling the inverter can include: setting a reference angular frequency for the rotating electrical machine; determining a reference voltage from the angular frequency; controlling switches of the inverter, such that the pulse width modulated output voltages of the inverter are generated which correspond to the reference voltage; determining an estimated flux vector as described in the above and in the following; and using the estimated flux vector for diagnostics.

An exemplary embodiment of the present disclosure also provides a program element (e.g., a computer program) for calculating the flux in a rotating electrical machine, which, when executed by a processor, causes the processor to carry out the steps of the method as described in the above and in the following. For example, a controller of the inverter may include the processor.

An exemplary embodiment of the present disclosure also provides a non-transitory computer-readable recording medium, in which such a program element is stored. A non-transitory computer-readable recording medium may be, for example, a floppy disk, a hard disk, an USB (Universal Serial Bus) storage device, a RAM (Random Access Memory), a ROM (Read Only memory) and an EPROM (Erasable Programmable Read Only Memory).

An exemplary embodiment of the present disclosure also provides a controller for an inverter, where such controller is configured to carry out the method as described in the above and in the following.

An exemplary embodiment of the present disclosure provides a system. According to an exemplary embodiment of the present disclosure, the system includes: an inverter with a controller adapted to carry out the method as described in the above and in the following; a cable connected to the output of the inverter; and a rotating electrical machine situated at another geographic location as the inverter and supplied by the cable. In accordance with an exemplary embodiment, sensors for determining input parameters for the determination of the estimated flux are situated solely at the inverter. The input parameters may be switching positions of the inverters, a DC link voltage and/or output currents of the inverter. After the inverter, there may be a step-up transformer connected the cable. Before the rotating electrical machine, there may be a step-down transformer connected to the cable.

It is to be understood that features of the method as described in the above and in the following may be features of the system or the controller and vice versa.

If technically possible but not explicitly mentioned, it is to be also understood that combinations of embodiments of the present disclosure described in the above and in the following may be embodiments of the method and the system.

These and other features and aspects of the present disclosure will be apparent from and elucidated with reference to the exemplary embodiments described hereinafter with reference to the drawings.

Figure 1:
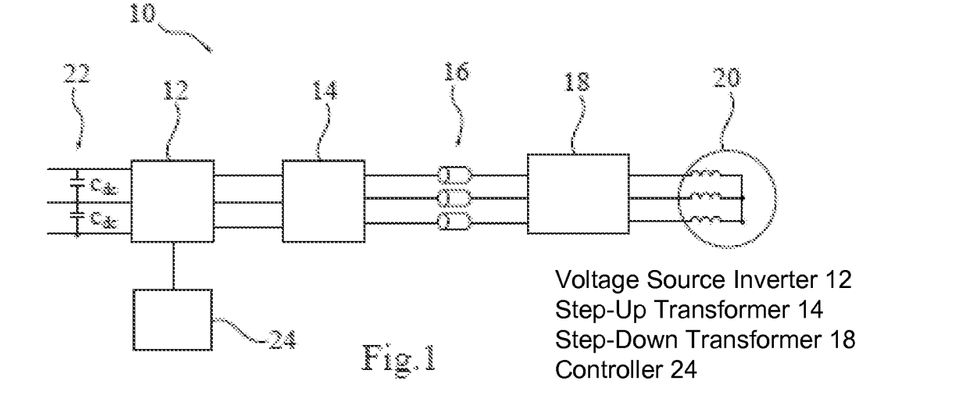
FIG. 1 shows a drive system according to an exemplary embodiment of the present disclosure.

FIG. 1 shows a drive system 10 which includes a voltage source inverter 12 connected to a step-up transformer 14, cables 16, and a step-down transformer 18, which is connected to a rotating electrical machine in the form of an electrical motor 20. For example, the cables 16 may be more than ten kilometers long. The used inverter topology may be a neutral point clamped (NPC) inverter 12, but other voltage source inverters connected to a DC bus 22 may be utilized. The DC link may be supplied by a rectifier.

For controlling the inverter 12, the system 10 includes a controller 24. In accordance with an exemplary embodiment, the controller 24 can include a processor (e.g., a general purpose processor or an application specific processor) configured to carry out the operative functions of the controller 24 as described herein.

Figure 2:
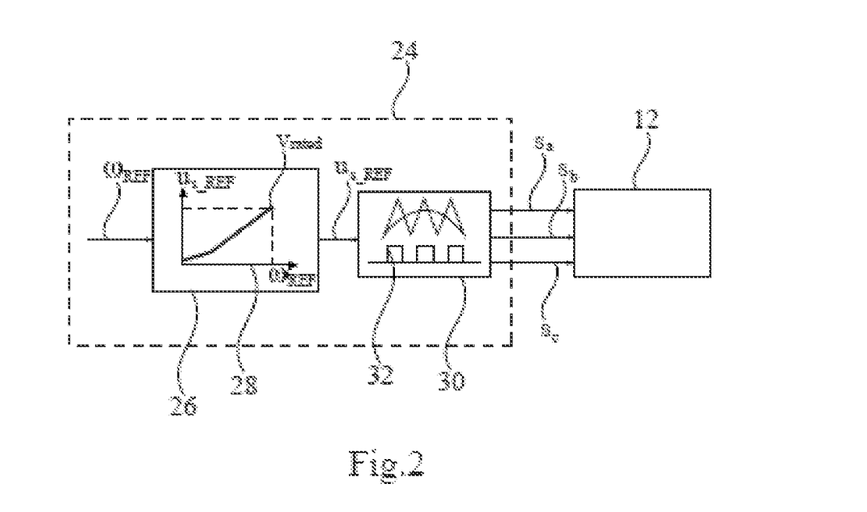
FIG. 2 shows components of a controller according to an exemplary embodiment of the present disclosure.

FIG. 2 shows components or modules of the controller 24. The modules may be functional modules of the controller and may be implemented as programmed software modules or procedures, respectively. However, one skilled in the art will understand that the functional modules may be implemented fully or partially in hardware, such as in the processor as described above.

The controller 24 is configured to work with the scalar mode principle and to control the inverter 24 such that a pulse width modulated current is generated at the output of the inverter 12. One input parameter of the controller 24 is a reference frequency $\omega_{REF}$ indicating the desired frequency of the motor. From the reference frequency $\omega_{REF}$, a reference voltage module 26 generates a reference voltage $U_{S\_REF}$ with the aid of a predefined voltage/frequency characteristic 28.

The reference voltage $U_{S\_REF}$ is input to a pulse width modulator module 30. The module 30 generates pulse lengths 32 from the reference voltage $U_{S\_REF}$ and switch states $S_a$, $S_b$, $S_c$ for the semiconductor switches of the inverter realizing the pulses 32 in the output currents of the inverter 14.

Open Loop Control, Voltage Model and Flux Estimation

Figure 3:
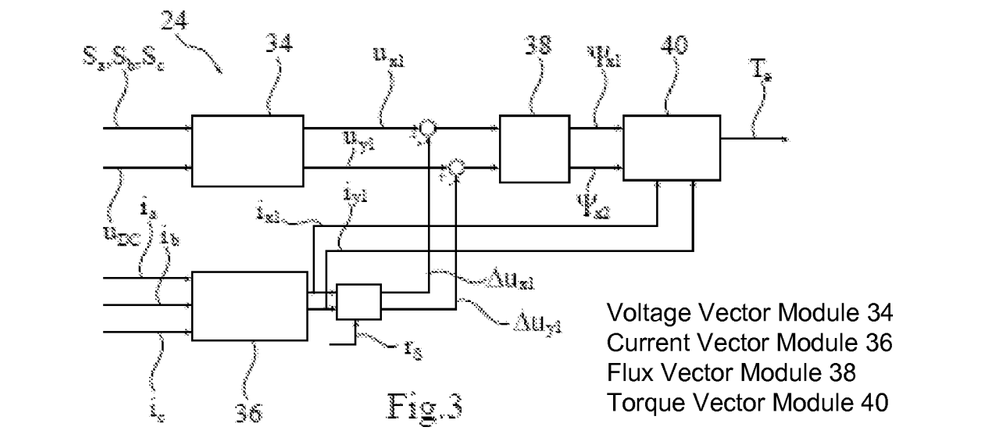
FIG. 3 shows further components of a controller according to an exemplary embodiment of the present disclosure.

FIG. 3 shows further components or modules of the controller 24 for calculating a stator flux vector ψ and an electromagnetic torque $T_e$ with a voltage model of the inverter 12 and the motor 20.

To implement the voltage model, a voltage vector module 34 calculates the complex voltage vector with components $U_{x1}$ and $U_{y1}$ with the aid of the input parameters $S_a$, $S_b$, $S_c$ and $U_{DC}$. The information of the inverter switch positions $S_a$, $S_b$, $S_c$ may come from the pulse width modulator module 30, and the DC link voltages $U_{DC}$ may be measured by a sensor in the DC link 22.

Further, the phase currents $i_a$, $i_b$, $i_c$, for example, measured at the output of the inverter 12, are converted to a complex current vector with components $i_{x1}$ and $i_{y1}$ by a 3/2 transformation in an current vector module 36. A voltage vector correction $\Delta U_{x1}$, $\Delta U_{y1}$ is calculated from the current vector $i_{x1}$, $i_{y1}$ with the aid of an estimated resistance $r_S$ and is added to the voltage vector $U_{x1}$, $U_{y1}$. The estimated resistance $r_S$ may be based on the resistive parts of the motor stator winding, the step-up transformer 14 and the cables 18 between the inverter and the motor 20, for example.

By integrating the resulting voltage vector $U_{x1}$, $U_{y1}$, a flux vector module 38 calculates the estimated flux vector $\psi_{S\_EST}$ with components $\psi_{x1}$ and $\psi_{x2}$. From the estimated flux vector $\psi_{x1}$, $\psi_{x2}$ and the current vector $i_{x1}$, $i_{y1}$, a torque vector module 40 calculates the estimated torque $T_e$ of the motor 20.

The values calculate by the controller 24 contain errors due to voltage drop over inverter semiconductors and the passive components like filters, cables connected between inverter and motor terminals, errors in the measured DC voltages $U_{DC}$ and the measured phase currents $i_a$, $i_b$, $i_c$.

In the following, the open loop control of the motor 20 executed by the controller 24 and the corresponding calculation steps, the voltage model and the flux estimation will be described in more detail.

The voltage model is based on the general equation for the stator voltage $u_S^{(k)}$ in (k) coordinates, which is defined by:

$$\vec{u}_S^{(k)} = r_S \cdot \vec{i}_S + \frac{d\vec{\psi}_S^{(k)}}{dt} + j\omega_k \cdot \vec{\psi}_S^{(k)} \tag{1}$$

where $i_S$ is the stator current, $\psi_S$ is the stator flux vector and $\omega_k$ is the angular frequency of the motor.

In stator coordinates $\omega_k = 0$ and the voltage equation (1) becomes:

$$\vec{u}_S^{(k)} = r_S \cdot \vec{i}_S + \frac{d\vec{\psi}_S^{(k)}}{dt}. \tag{2}$$

The stator flux vector $\psi_S$ is defined by:

$$\vec{\psi}_S = \int (\vec{u}_S - r_S \cdot \vec{i}_S) \cdot dt \tag{3}$$

where $u_S$ is the stator voltage, and the stator current fundamental component $i_S$ may be defined by $$\vec{i}_S = i_S \cdot e^{j\omega t} \tag{4}$$

In the open loop scalar mode, the stator flux vector $\psi_S$ is calculated based on the equation (3), wherein $r_S$ includes all resistive losses in the path from the inverter output to the motor terminals.

Errors in the Flux Estimation

The error in the integral (3) influences on a wrong estimated (stator) flux vector $\psi_{S\_EST}$ (which may be calculated analogously to $\psi_S$ in formula (3)). Due to the errors in the estimated flux vector $\psi_{S\_EST}$, an inaccurate torque $T_e$ is calculated, which is the cross product of the estimated flux vector $\psi_{S\_EST}$ and the current vector $i_S$. The influence of errors in the integration is more visible in the low frequencies. At the very low frequencies, there may be a need to supply additional compensation voltage, due to a high voltage loss because of the resistance $r_S$. The frequency ω where the compensation is needed may depend on the application and the voltage drop.

If the effect of the open loop integration error is not corrected, the estimated flux vector $\psi_{S\_EST}$ is shifting from the origin. As a result, the calculated torque $T_e$ and the estimated power on the shaft (depending on the torque, for example) may oscillate.

Figure 4:
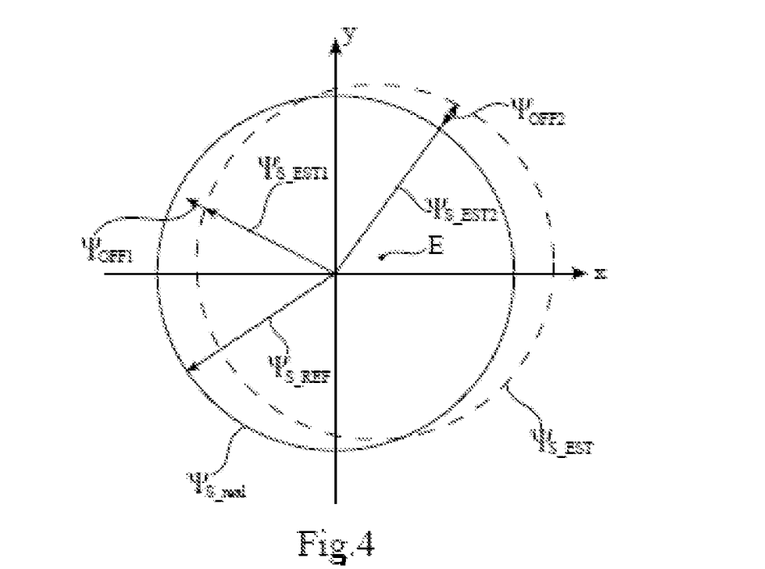
FIG. 4 shows a diagram depicting an error correction according to an exemplary embodiment of the present disclosure.

The error of the integration is indicated in FIG. 4. The estimated flux vector $\psi_{S\_EST}$ is circling with angular frequency w around a point E differing form the origin of the complex x-y-plane.

The errors which lead to a drift in the estimated flux vector $\psi_{S\_EST}$ occur in two cases: (1) first, the measured intermediate voltage may be smaller then the real DC voltage; (2) second, there may be an offset error in the measured phase currents, which causes a DC component in the phase currents and finally will result in an unstable integration. These facts may be derived from the following equations.

The flux equation (3) could be written in the form:

$$\vec{\psi}_S = \int \vec{u}_S \cdot dt - r_S \cdot \int \vec{i}_S \cdot dt \tag{5}$$

The stator flux vector error could be defined as the difference between stator flux vector and the estimated flux vector (equation 7):

$$r_{S\_EST} = r_S + \Delta r_S \tag{6}$$

where $r_{S\_EST}$ is the estimated resistance, $r_S$ is the predefined estimated resistance, and $\Delta r_S$ is the estimate error.

The stator flux error vector is defined by:

$$\Delta \vec{\psi}_S = \vec{\psi}_S - \vec{\psi}_{S\_EST} \tag{7}$$

With the aid of (5) this yields:

$$\Delta \vec{\psi}_S = \int \vec{u}_S \cdot dt - r_S \cdot \int \vec{i}_S \cdot dt - \int \vec{u}_S \cdot dt + (r_S + \Delta r_S) \cdot \int \vec{i}_S \cdot dt \tag{8}$$

and $$\Delta \vec{\psi}_S = \Delta r_S \int \vec{i}_S \cdot dt \tag{9}$$

With (4) the flux error vector becomes:

$$\Delta \vec{\psi}_S = -j \frac{\Delta r_S}{\omega} \vec{i}_S. \tag{10}$$

From (10), it can be noticed that the stator flux error vector $\Delta \psi_S$ is proportional to the error in stator resistance $\Delta r_S$ and inverse proportional to the angular frequency ω.

If there is an offset in current vector, then the stator flux estimate is moved from the origin with the value amplified with $\Delta r_S$.

The estimated torque $T_{EL}$ could be calculated with the cross product of the stator flux vector $\psi_S$ and the stator current $i_S$. The error in the flux has a strait influence on the error in the torque.

$$T_{EL} = \vec{\psi}_S \times \vec{i}_S = (\vec{\psi}_{S\_EST} + \Delta\vec{\psi}_S) \times \vec{i}_S \quad (11)$$

$$T_{EL} = T_{EL\_EST} + \frac{\Delta r_S}{\omega} \vec{i}_S^2 \quad (12)$$

The torque error is proportional to the error in the stator resistance $\Delta r_S$ and inverse proportional to the angular velocity $\omega$.

It follows that the stator flux vector errors and electromagnetic torque errors are small at higher speed, but are very high, if the angular velocity $\omega$ is close to zero.

Compensation of Errors of the Flux Estimation

In the following, a compensation algorithm of the flux offset in open loop systems, which may be executed by the flux vector module 38, will be explained:

Generally, in the open loop scalar mode, the flux vector is estimated with the integration equation (3). The stator flux drift from the origin causes the estimated torque oscillation, following as well calculated power oscillations.

With the compensation algorithm, the estimated stator flux vector $\psi_{S\_EST}$ is calculated in a discrete time domain. Firstly, at a computational time level or time step Ts1, the preliminary value of the stator flux vector $\psi_{S\_EST\_PRELIMINARY}$ is obtained according to (13):

$$\vec{\psi}_{S\_EST\_PRELIMINARY}[k] = \vec{\psi}_{S\_EST}[k-1] + \omega_N \cdot Ts1 \cdot \vec{u}_{INV}[k] \quad (13)$$

where $\psi_{S\_EST\_PRELIMINARY}[k]$ is the preliminary value of the stator flux vector in the k-th calculation cycle, which is based on the last valid stator flux estimate $\psi_{S\_EST}[k]$. Further, $u_{INV}$ is the inverter voltage vector calculated with the aid of the measured intermediate voltage $U_{DC}$ and the switching positions. The components $u_{x1}$ and $u_{y1}$ of $u_{INV}$ may be calculated with the modules 34 and 36 (see above).

The voltage losses integral due to stator resistance and stator current is calculated according to (14):

$$\Delta \vec{u}_{S\_LOSS}[k] = \omega_N \cdot Ts1 \cdot r_{S\_EST} \cdot \vec{i}_S[k] \quad (14)$$

The estimated value of the stator flux vector $\psi_{S\_EST}$ in the k-th calculation cycle is corrected with (14), $$\vec{\psi}_{S\_EST}[k] = \vec{\psi}_{S\_EST\_PRELIMINARY}[k] - \omega_N \cdot Ts1 \cdot r_{S\_EST} \cdot \vec{i}_S[k] \quad (15)$$

As the estimated flux vector $\psi_{S\_EST}$ is calculated from the voltage integration, the open flux integration algorithm may have errors, which may be seen as a drift from the origin in the complex plane (see FIG. 4). The drift of the estimated flux vector is affecting the oscillation in the calculated torque and power. The actual signals are used for control and diagnostic purposes and certain accuracy is required. The following algorithm for compensation of the drift of the estimated flux vector is utilized for correcting the flux offset vector and improves the torque and power estimations.

The stator flux offset vector $\psi_{OFFSET}$ is defined by (16):

$$\vec{\psi}_{OFFSET} = \vec{\psi}_{S\_EST} \cdot \left(1 - \frac{\psi_{S\_REF}}{|\psi_{S\_EST}|}\right) \quad (16)$$

where $\psi_{S\_REF}$ is a reference stator flux magnitude, and $|\psi_{S\_EST}|$ is the amplitude or magnitude or length of the estimated stator flux vector. The reference stator flux magnitude $\psi_{S\_REF}$ may be, derived from the reference frequency $\omega_{REF}$, which is used to calculate $u_{S\_REF}$ (see FIG. 2 and corresponding description).

A compensated flux offset vector $\psi_{OFF\_COMPENSATE}$ is defined with (17):

$$\vec{\psi}_{OFF\_COMPENSATE} = Pgain \cdot \vec{\psi}_{OFFSET} \quad (17).$$

Pgain is a gain value for the flux offset vector and may have a value between 0.1 and 0.2, for example.

The expression in brackets in formula (16) is a first real factor. Pgain in formula (17) is a second real factor. Summarized, the (compensated) flux offset vector is calculated by multiplying the estimated flux vector with a real factor that is the product of the first and second real factors.

For compensating errors, the compensated flux offset vector (17) is added to the resistive voltage loss integral equation (18):

$$\vec{\psi}_{S\_EST}[k] = \vec{\psi}_{S\_EST\_PRELIMINARY}[k] - (\omega_N \cdot Ts1 \cdot r_{S\_EST} \cdot \vec{i}_S[k] + \vec{\psi}_{OFF\_COMPENSATE}[k]) \quad (18)$$

From equation (16) to (18) it can be derived that the estimated flux vector $\psi_{S\_EST}$ is shortened, if the magnitude of the estimated flux $\psi_{S\_EST}$ is bigger than the reference flux magnitude $\psi_{S\_REF}$ and the estimated flux vector $\psi_{S\_EST}$ is shortened, if the magnitude of estimated flux vector $\psi_{S\_EST}$ is smaller than the reference flux magnitude $\psi_{S\_REF}$.

This is indicated in FIG. 4. The reference flux vector may have the same or similar magnitude $\psi_{S\_REF}$ as the real stator flux $\psi_{S\_real}$. In this case, the estimated flux vector $\psi_{S\_EST1}$ is smaller than the real flux vector $\psi_{S\_real}$, the flux vector $\psi_{S\_EST1}$ is lengthened by an offset vector $\psi_{OFF1}$. In this case, the estimated flux vector $\psi_{S\_EST2}$ is bigger than the real flux vector $\psi_{S\_real}$, the flux vector $\psi_{S\_EST2}$ is lengthened by an offset vector $\psi_{OFF2}$. In any case, after the correction the estimated flux vector is nearer to the real flux and therefore less erroneous with respect to the real flux vector. The goal of the correction is to compensate for the offset and not the adaptation of the flux amplitude.

After the compensation, the flux offset vector may be used for compensating the torque error:

$$T_{EL} = T_{EL-EST} - \vec{\psi}_{OFF\_COMPENSATE} \times \vec{i}_S \quad (19).$$

The electromagnetic torque (19) and angular velocity define the estimated power.

Figure 5A:
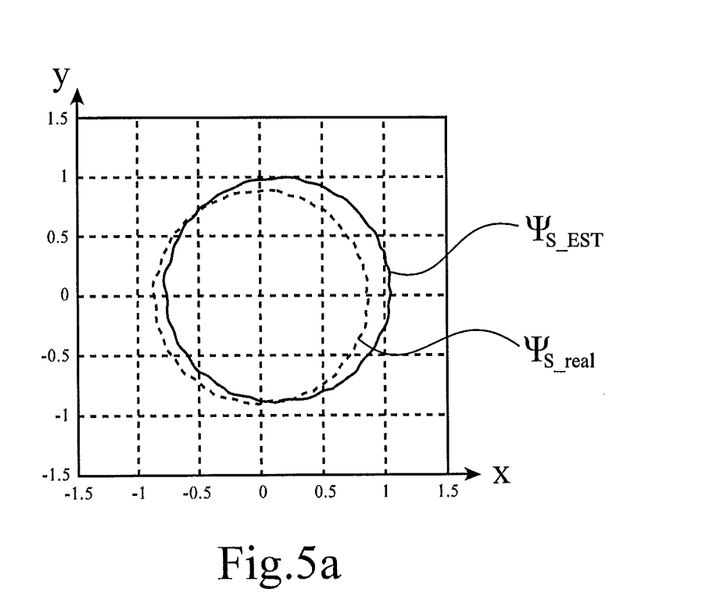
FIGS. 5a and 5b show an example of how the flux is corrected according to an exemplary embodiment of the present disclosure.
Figure 5B:
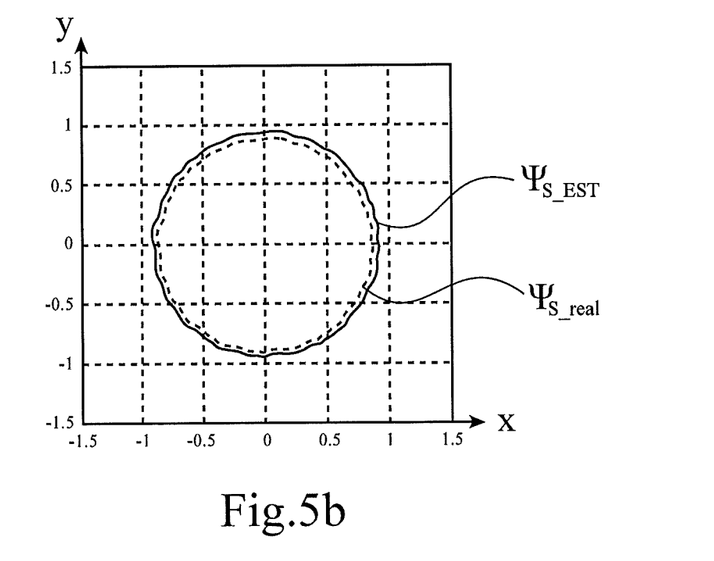
Figure 6A:
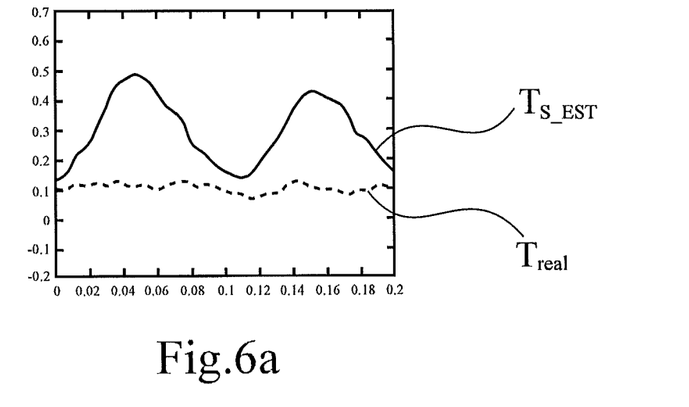
FIGS. 6a and 6b show an example of how the torque is corrected according to an exemplary embodiment of the present disclosure.
Figure 6B:
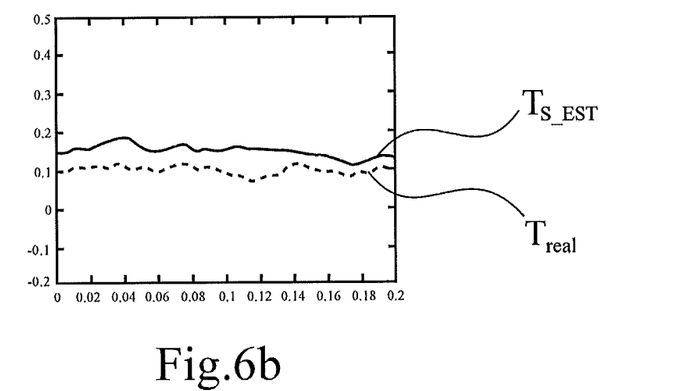
Figure 7A:
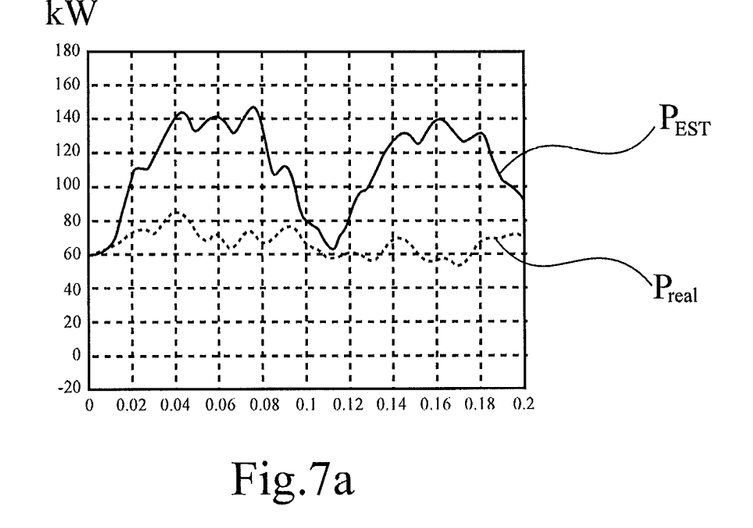
FIGS. 7a and 7b show an example of how the power is corrected according to an exemplary embodiment of the present disclosure.
Figure 7B:
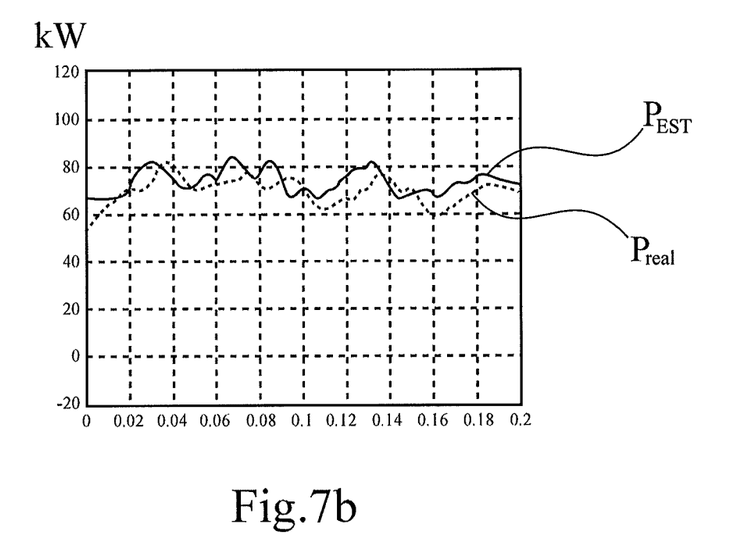

The following FIGS. 5a, 5b, 6a, 6b, 7a and 7b show simulated and calculated data of the flux $\psi$, the torque T and the power P, wherein in FIGS. 5a, 6a and 7a the flux compensation according to the present disclosure is absent and in FIGS. 5b, 6b and 7b the flux is compensated according to the algorithm as described in the above.

The data has been simulated at a steady state operation of the motor 20 with low speed, (e.g., 0.05 of the maximal speed) and a load of 10%.

FIGS. 5a and 5b show the real flux $\psi_{S\_real}$ and the estimated flux vector $\psi_{S\_EST}$ in the complex plane. As may be seen from FIGS. 5a and 5b, the offset of the estimated flux vector $\psi_{S\_EST}$ from the origin in FIG. 5a is compensated for by the algorithm.

FIGS. 6a and 6b show the real torque $T_{real}$ and the estimated torque $\psi_{S\_EST}$. As may be seen from FIGS. 6a and 6b, most of the variations of the estimated torque $\psi_{S\_EST}$ in FIG. 6a are compensated for by the algorithm in FIG. 6b.

FIGS. 7a and 7b show the real shaft power $P_{real}$ and the estimated shaft power $P_{EST}$. As may be seen from FIG. 7a and FIG. 7b, most of the variations of the estimated torque $P_{EST}$ in FIG. 7a are compensated by the algorithm in FIG. 7b.

While the disclosure has been illustrated and described in detail in the drawings and the foregoing description, such illustration and description are to be considered illustrative or exemplary and not restrictive. The present disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference numerals in the claims should not be construed as limiting the scope.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for calculating the flux in a rotating electrical machine which is electrically supplied by an inverter, the method comprising:
   determining an inverter voltage vector ($u_{x1}$, $u_{y1}$);
   determining an inverter current vector ($i_{x1}$, $i_{y1}$);
   calculating an estimated flux vector as ($\psi_{S\_EST}$) based on the inverter voltage vector and the inverter current vector;
   comparing a length of the estimated flux vector with a reference flux magnitude ($\psi_{S\_REF}$); and
   compensating for errors by changing the length of the estimated flux vector ($\psi_{S\_EST}$), depending on the comparison of the length of the estimated flux vector ($\psi_{S\_EST}$) with the reference flux magnitude ($\psi_{S\_REF}$),
   wherein a compensated flux offset vector ($\psi_{OFF\_COMPENSATE}$) is added to a resistive voltage loss integral ($\omega_N \cdot Ts1 \cdot r_{S\_EST} \cdot \vec{i}_S[k]$), and the estimated flux vector ($\psi_{S\_EST}$) is calculated according to the following equation $$\vec{\psi}_{S\_EST}[k] = \vec{\psi}_{S\_EST\_PRELIMINARY}[k] - (\omega_N \cdot Ts1 \cdot r_{S\_EST} \cdot \vec{i}_S[k] + \vec{\psi}_{OFF\_COMPENSATE}[k]).$$

2. The method of claim 1, comprising:
   determining an offset vector by multiplying the estimated flux vector with a factor, the factor depending on a ratio of the reference flux magnitude and the length of the estimated flux vector; and
   changing the length of the estimated flux vector by adding the offset vector to the estimated flux vector.

3. The method of claim 2, wherein the factor depends on a ratio of a difference between the length of the estimated flux vector and the reference flux magnitude, and the length of the estimated flux vector.

4. The method of claim 3, wherein the factor comprises a fixed gain value.

5. The method of claim 4, wherein the fixed gain value is between 0.1 and 0.2.

6. The method of claim 3, wherein the inverter voltage vector is determined based on at least one of switching positions of the inverter and voltages at inputs of the inverter.

7. The method of claim 3, wherein the inverter current vector is determined based on at least one of currents at inputs of the inverter and currents at outputs of the inverter.

8. The method of claim 3, wherein the estimated flux vector is derived from a previous flux vector by adding a difference vector and a voltage loss vector,
   wherein the difference vector depends on a reference angular frequency, a length of a discrete time step, and the inverter voltage vector, and
   wherein the voltage loss vector depends on the reference angular frequency, the length of a discrete time step, a predefined resistor value, and the inverter current vector.

9. The method of claim 2, wherein the factor comprises a fixed gain value.

10. The method of claim 9, wherein the fixed gain value is between 0.1 and 0.2.

11. The method of claim 1, wherein the inverter voltage vector is determined based on at least one of switching positions of the inverter and voltages at inputs of the inverter.

12. The method of claim 1, wherein the inverter current vector is determined based on at least one of currents at inputs of the inverter and currents at outputs of the inverter.

13. The method of claim 1, wherein the estimated flux vector is derived from a previous flux vector by adding a difference vector and a voltage loss vector,
   wherein the difference vector depends on a reference angular frequency, a length of a discrete time step, and the inverter voltage vector, and
   wherein the voltage loss vector depends on the reference angular frequency, the length of a discrete time step, a predefined resistor value, and the inverter current vector.

14. A method for controlling an inverter, comprising:
   setting a reference angular frequency for a rotating electrical machine;
   determining a reference voltage from the reference angular frequency;
   controlling switches of the inverter, such that modulated output voltages of the inverter are generated which correspond to the reference voltage;
   determining an inverter voltage vector;
   determining an inverter current vector;
   determining an estimated flux vector based on the inverter voltage vector and the inverter current vector; and
   using the estimated flux vector for diagnostics, wherein the estimated flux vector ($\psi_{S\_EST}$) is calculated according to the following equation $$\psi_{S\_EST} = \psi_{S\_EST\_PRELIMINARY}[k] - (\omega_N \cdot Ts1 \cdot r_{S\_EST} \cdot i_S[k] + \psi_{OFF\_COMPENSATE}[k]).$$

15. The method of claim 14, comprising:
   comparing a length of the estimated flux vector with a reference flux magnitude; and
   compensating for errors by changing the length of the estimated flux vector, depending on the comparison of the length of the estimated flux vector with the reference flux magnitude.

16. A non-transitory computer-readable recording medium having a program recorded thereon that causes a processor of a computer processing device to execute operations comprising:
   determining an inverter voltage vector ($u_{x1}$, $u_{y1}$);
   determining an inverter current vector ($i_{x1}$, $i_{y1}$);

calculating an estimated flux vector as ($\psi_{S\_EST}$) based on the inverter voltage vector and the inverter current vector;

comparing a length of the estimated flux vector ($\psi_{S\_EST}$) with a reference flux magnitude ($\psi_{S\_REF}$); and compensating for errors by changing the length of the estimated flux vector ($\psi_{S\_EST}$), depending on the comparison of the length of the estimated flux vector ($\psi_{S\_EST}$) with the reference flux magnitude ($\psi_{S\_REF}$), wherein a compensated flux offset vector ($\psi_{OFF\_COMPENSATE}$) is added to a resistive voltage loss integral ($\omega_N \cdot Ts1 \cdot r_{S\_EST} \cdot \vec{i}_S[k]$), and the estimated flux vector ($\psi_{S\_EST}$) is calculated according to the following equation $$\vec{\psi}_{S\_EST}[k] = \vec{\psi}_{S\_EST\_PRELIMINARY}[k] - (\omega_N \cdot Ts1 \cdot r_{S\_EST} \cdot \vec{i}_S[k] + \vec{\psi}_{OFF\_COMPENSATE}[k]).$$

17. The non-transitory computer-readable recording medium of claim 16, wherein the program causes the processor to perform operations comprising:

determining an offset vector by multiplying the estimated flux vector with a factor, the factor depending on a ratio of the reference flux magnitude and the length of the estimated flux vector; and changing the length of the estimated flux vector by adding the offset vector to the estimated flux vector.

18. The non-transitory computer-readable recording medium of claim 17, wherein the program causes the processor to execute at least one of the following operations:

determining the inverter voltage vector based on at least one of switching positions of the inverter and voltages at inputs of the inverter;

determining the inverter current vector based on at least one of currents at inputs of the inverter and currents at outputs of the inverter; and deriving the estimated flux vector from a previous flux vector by adding a difference vector and a voltage loss vector, wherein the difference vector depends on a reference angular frequency, a length of a discrete time step, and the inverter voltage vector, and the voltage loss vector depends on the reference angular frequency, the length of a discrete time step, a predefined resistor value, and the inverter current vector.

19. A controller for an inverter, the controller comprising a processor configured to:

determine an inverter voltage vector ($u_{x1}$, $u_{y1}$);

determine an inverter current vector ($i_{x1}$, $i_{y1}$);

calculate an estimated flux vector ($\psi_{S\_EST}$) based on the inverter voltage vector and the inverter current vector;

compare a length of the estimated flux vector ($\psi_{S\_EST}$) with a reference flux magnitude ($\psi_{S\_REF}$); and compensate for errors by changing the length of the estimated flux vector ($\psi_{S\_EST}$), depending on the comparison of the length of the estimated flux vector with the reference flux magnitude ($\psi_{S\_REF}$), wherein a compensated flux offset vector ($\psi_{OFF\_COMPENSATE}$) is added to a resistive voltage loss integral ($\omega_N \cdot Ts1 \cdot r_{S\_EST} \cdot \vec{i}_S[k]$), and the estimated flux vector ($\psi_{S\_EST}$) is calculated according to the following equation $$\vec{\psi}_{S\_EST}[k] = \vec{\psi}_{S\_EST\_PRELIMINARY}[k] - (\omega_N \cdot Ts1 \cdot r_{S\_EST} \cdot \vec{i}_S[k] + \vec{\psi}_{OFF\_COMPENSATE}[k]).$$

20. A system comprising:

an inverter including a controller according to claim 19;

a cable connected to an output of the inverter; and an rotating electrical machine situated at another geographic location from the inverter and supplied by the cable;

wherein sensors for determining input parameters for the determination of the estimated flux vector by the controller of the inverter are situated at the inverter.

21. The system of claim 20, further comprising:

a step-up transformer and a step-down transformer connected to the cable.

22. A controller for an inverter, the controller comprising a processor configured to:

set a reference angular frequency for a rotating electrical machine;

determine a reference voltage from the reference angular frequency;

control switches of the inverter, such that modulated output voltages of the inverter are generated which correspond to the reference voltage;

determine an inverter voltage vector;

determine an inverter current vector;

determine an estimated flux vector based on the inverter voltage vector and the inverter current vector; and use the estimated flux vector for diagnostics, wherein the estimated flux vector ($\psi_{S\_EST}$) is calculated according to the following equation $$\psi_{S\_EST} = \psi_{S\_EST\_PRELIMINARY}[k] - (\omega_N \cdot Ts1 \cdot r_{S\_EST} \cdot i_S[k] + \psi_{OFF\_COMPENSATE}[k]).$$

23. A system comprising:

an inverter including a controller according to claim 22;

a cable connected to an output of the inverter; and a rotating electrical machine situated at another geographic location from the inverter and supplied by the cable, wherein sensors for determining input parameters for the determination of the estimated flux vector by the controller of the inverter are situated at the inverter.

24. A non-transitory computer-readable recording medium having a program recorded thereon that causes a processor of a computer processing device to execute operations comprising:

setting a reference angular frequency for a rotating electrical machine;

determining a reference voltage from the reference angular frequency;

controlling switches of the inverter, such that modulated output voltages of the inverter are generated which correspond to the reference voltage;

determining an inverter voltage vector;

determining an inverter current vector;

determining an estimated flux vector based on the inverter voltage vector and the inverter current vector; and using the estimated flux vector for diagnostics wherein the estimated flux vector ($\psi_{S\_EST}$) is calculated according to the following equation $$\psi_{S\_EST} = \psi_{S\_EST\_PRELIMINARY}[k] - (\omega_N \cdot Ts1 \cdot r_{S\_EST} \cdot i_S[k] + \psi_{OFF\_COMPENSATE}[k]).$$

25. The non-transitory computer-readable recording medium of claim 24, wherein the program causes the processor to execute operations comprising:

comparing a length of the estimated flux vector with a reference flux magnitude; and compensating for errors by changing the length of the estimated flux vector, depending on the comparison of the length of the estimated flux vector with the reference flux magnitude.

* * * * *